Figure 1:
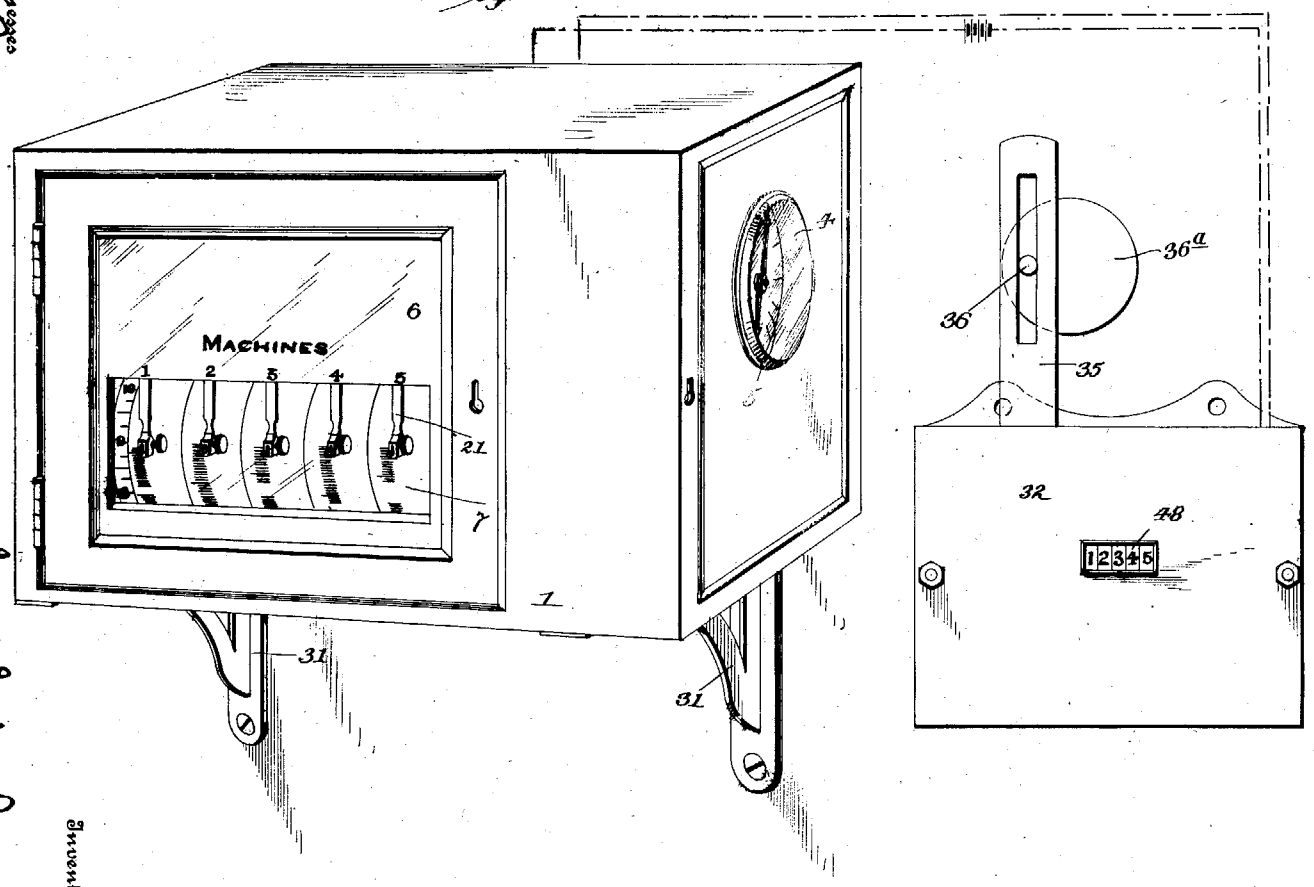

S. S. BERRY.

AUTOMATIC WORK RECORDING APPLIANCE.

APPLICATION FILED DEC. 20, 1907.

12,908. Reissued Jan. 5, 1909.

3 SHEETS—SHEET 1.

Witnesses
E. E. Porter
A. E. Montague.

Inventor:
Samuel Simpson Berry,
By Dodge and Sons, Attorneys.

S. S. BERRY.
AUTOMATIC WORK RECORDING APPLIANCE.
APPLICATION FILED DEC. 20, 1907.
12,908. Reissued Jan. 5, 1909.
3 SHEETS—SHEET 2.
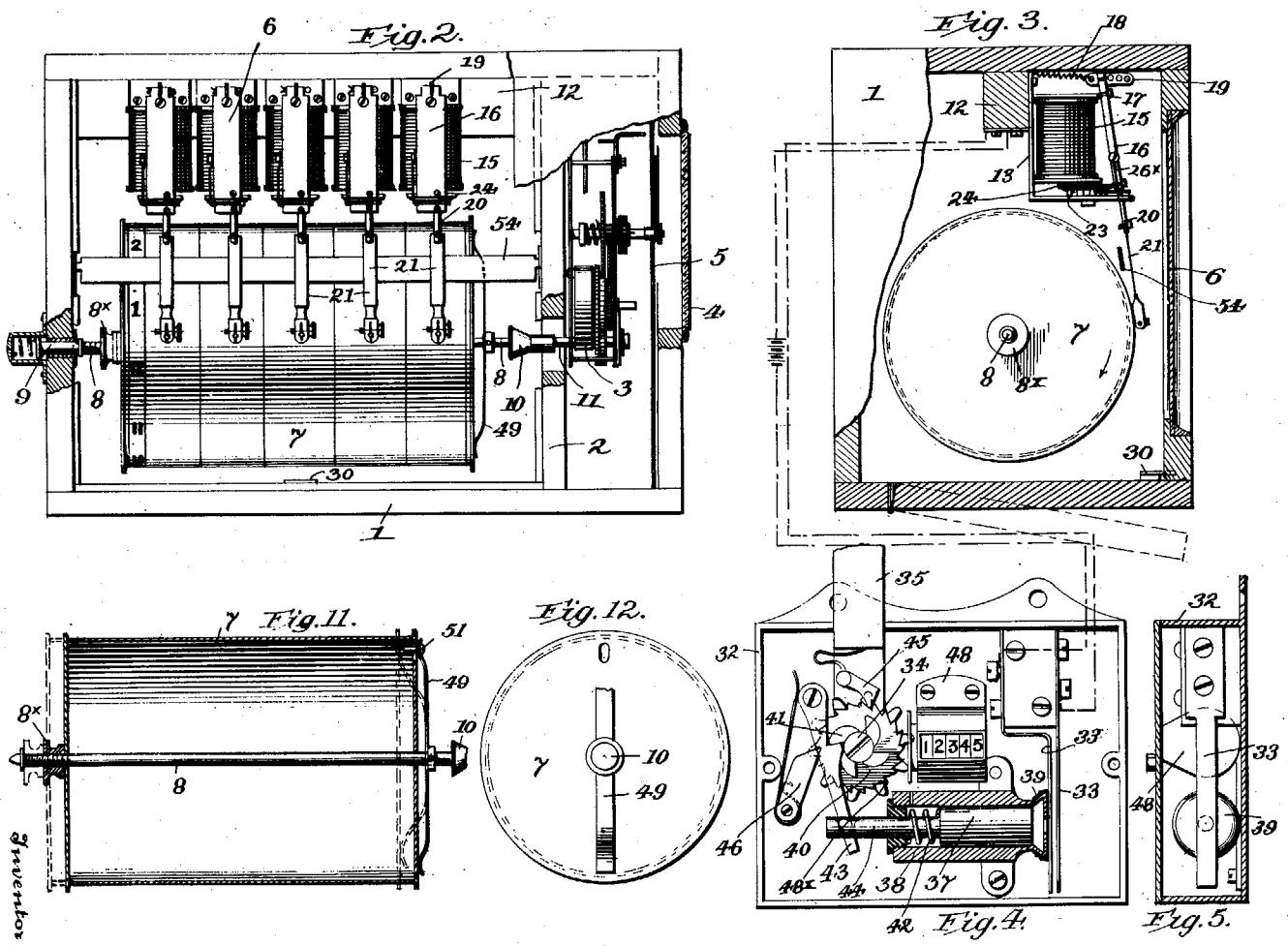
Witnesses
E. A. Rauch
H. E. Montague
Inventor:
By Samuel Simpson Berry,
Dodge and Sons, Attorneys S. S. BERRY.
AUTOMATIC WORK RECORDING APPLIANCE.
APPLICATION FILED DEC. 20, 1907.
12,908. Reissued Jan. 5, 1909.
3 SHEETS—SHEET 3.
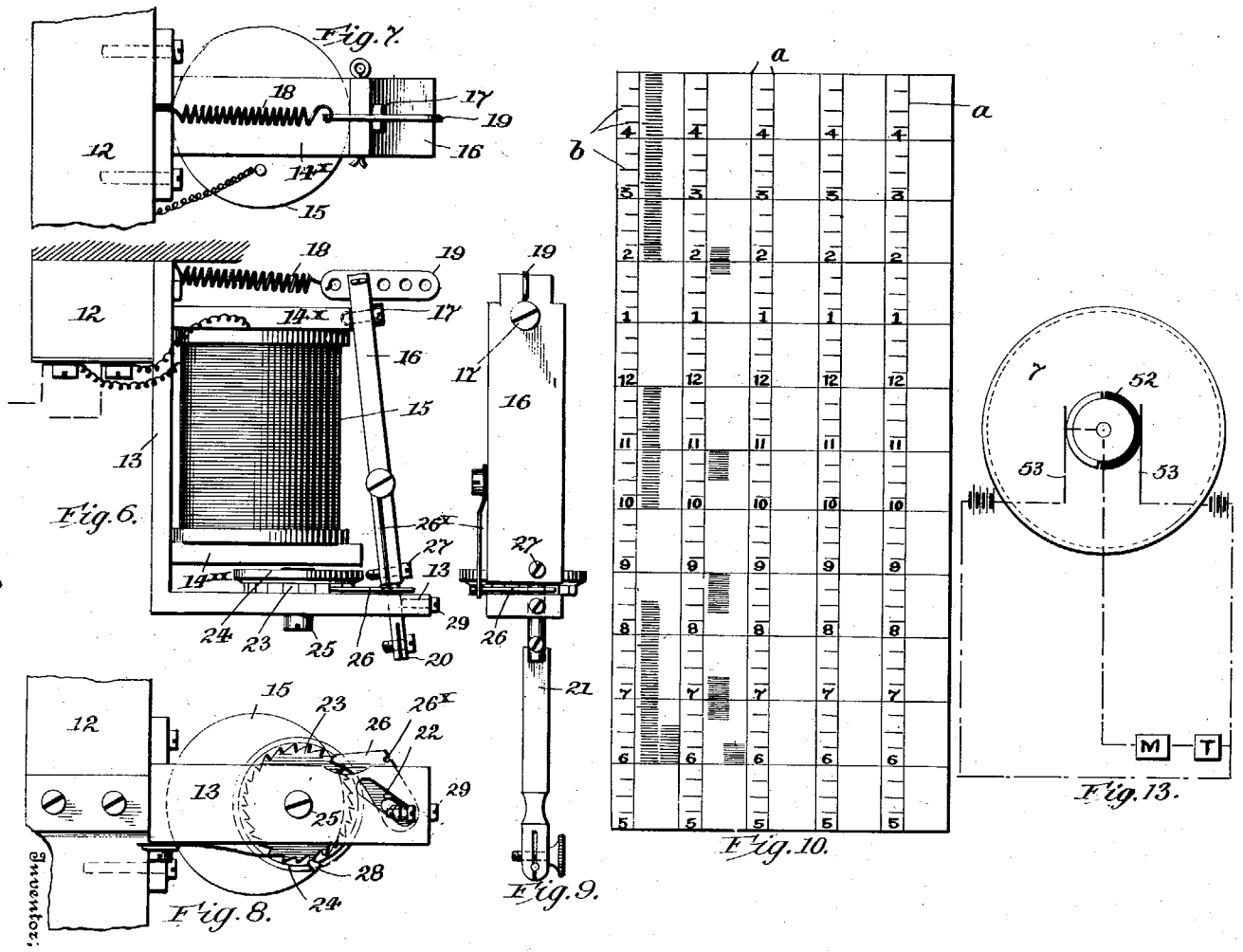
Witnesses
E. H. Kaider,
H. E. Montague.
By Samuel Simpson Berry,
Dodge and Sons,
Attorneys

UNITED STATES PATENT OFFICE.

SAMUEL SIMPSON BERRY, OF MANCHESTER, ENGLAND.

AUTOMATIC WORK-RECORDING APPLIANCE.

No. 12,908. Specification of Reissued Letters Patent. Reissued Jan. 5, 1909.

Original No. 831,030, dated September 18, 1906, Serial No. 261,702. Application for reissue filed December 20, 1907. Serial No. 407,428.

*To all whom it may concern:*

Be it known that I, SAMUEL SIMPSON BERRY, a subject of the King of Great Britain and Ireland, and a resident of Urmston, Manchester, England, have invented a certain new or Improved Automatic Work-Recording Appliance, of which the following is a specification.

This invention has for its object to provide a simple and inexpensive arrangement of mechanism whereby a permanent record may be obtained of any form of mechanical operation, such as the work done by a printing-machine or a box-making machine or the like, or even the revolutions of a turnstile; and a further object is so to construct, arrange and operate the mechanism that besides indicating numbers or like data it will also indicate the rate of progression, as well as the stoppages and the duration of such stoppages, and thus act as a telltale or check on the person in charge of the machine.

Another object is to enable the indicating or recording parts of the mechanism to be worked at a distance from the machine, and thus permit of such parts being kept in, say, the office of a works or at a private residence, and therefore removed from the person using the machine and under the eye of the person requiring the record.

According to the invention, I employ a drum or endless band to which I fit a sheet of paper, hereinafter called the "time-sheet." Upon such time-sheet are lines or markings representing divisions of time and also numerals denoting the hours of the day (or longer) and, if desired, the fractions of each hour. To the axis of this drum is geared a suitable motor, preferably of the spring-clockwork type and designed to rotate the drum at a speed which represents one hour for each division on the time-sheet.

Resting upon the drum is the point of a style or pencil, and such pencil is adjustably carried at the free end of a small plate or lever, hereinafter called the "recording-lever". This lever is mounted upon a horizontal axis and is capable of a slight to-and-fro movement.

Adjacent to the opposite end of the recording-lever is an electromagnet or solenoid. From the windings of the magnet-poles extend conducting wires to a switch near the machine, a suitable battery being included in the circuit.

Connected to the operative part of the switch is a suitable moving part of the machine which at every revolution acts as upon the switch in such a manner as to cause the switch at each impulse or after a series of impulses to complete the circuit of the electromagnet and by energizing the magnet attract and impart movement to the recording-lever, which, carrying the pencil, marks the time-sheet.

Upon the switch being made free the circuit of the magnet is broken and the lever and pencil under the force of a spring return to their former positions until the current of the magnets is again completed, when they are again actuated and the time-sheet again marked, and so on continuously.

To allow for the ready calculating of the strokes, (especially when the peripheral speed of the drum is very slow) provision is made whereby, say, every twentieth stroke is longer than the other, this being effected by means of a notched disk-and-ratchet mechanism and a small projection on the recording-lever. Thus with the switch closed at every fourth sheet the lengthened mark will indicate every one hundredth sheet. The projection under the impulse of the lever strikes the periphery of the disk for each short stroke, while under the impulse representing each twentieth stroke the said projection takes into the notch, and thus allows for a longer stroke on the recording-drum. The disk is rotated or advanced tooth by tooth by means of a pawl, and thus works in sympathy with the making and breaking of the circuit. By means of a retaining-spring and pawl the wheel and disk are prevented from returning, and the movement is equal for each impulse.

By extending the length of the drum and providing the sheet with separate divisions and also by providing a separate switch, magnet, and lever for each the work done on a series of machines may be recorded on the one drum.

Upon the accompanying drawings I have shown my invention as designed for recording the work done on five machines, this being an average example, and serving well to demonstrate the general characteristics of the invention.

Figure 1 illustrates the entire apparatus, the left-hand part being a front elevation in perspective of that portion of the apparatus forming (or inclosing) the recording mechanism, which is usually placed within sight of the person requiring the record, and the right-hand part being a front elevation of that portion of the apparatus forming or inclosing the switch, which is usually on the machine and within sight of the workman. Fig. 2 illustrates a geometric front elevation with the front of the casing removed and with certain parts in section. Fig. 3 illustrates a part-vertical cross-section. Fig. 4 illustrates a front view, and Fig. 5 a vertical section of the "switch" part of the apparatus which is applied to the machine and is actuated by a moving part of the machine. Fig. 6 illustrates on an enlarged scale a side elevation, Fig. 7 a top plan, and Fig. 8 an inverted plan, of the chief parts of the recording mechanism. Fig. 9 illustrates a front view of the recording-lever. Fig. 10 illustrates a plan of a time-sheet after being removed from the drum and showing typical markings for the five machines. Fig. 11 illustrates a longitudinal section, and Fig. 12 a right-hand end view, of the drum alone. Fig. 13 illustrates the manner in which the motion of the drum may be utilized for preventing the undue exhaustion of the batteries.

Referring to Figs. 1, 2 and 3, the whole of the recording apparatus is inclosed in a casing 1, preferably of wood (mahogany) and suitably finished (polished) to give a neat and pleasing outward appearance, and such as to make it suitable to fix in an office.

At one end of the casing and supported upon a partition 2 is the spring-motor 3, which also serves as a clock, the end of the casing being formed with a glazed door 4, through which shows the clock-dial 5. Within the other part of the casing, which is provided with a hinged and glazed front 6, is the drum 7, mounted upon axis 8, which is centered or takes its bearings between a spring-pressed pin or center 9 and a cone 10, this latter being fixed to the axis 11 of the motor 3. The motor is preferably of the double-spring type, and the axis 11 is preferably that of the first-motion member, so as to give a powerful, positive and uniform drive.

Around the drum is wrapped and fixed a sheet of paper (see Fig. 10) the length of which equals or slightly exceeds the circumference of the drum. Upon the face of such paper, which is preferably of a glazed finish or such as to take an impression when rubbed by a metal style, are printed the several vertical lines *a* and markings, *b*, (see Fig. 10), the lines producing an annular column or space for the record of each machine and the markings corresponding to the peripheral speed of the drum for the twelve hours of the day.

Upon a rail 12, secured to the top of the casing 1 and above the drum, is a series of brackets 13, and upon each bracket and between two lateral extensions $14^{\times}$, $14^{\times\times}$ thereof is an electromagnet 15, the poles of which are riveted through the said extensions $14^{\times}$ $14^{\times\times}$, and thereby cause the extensions to act as the poles proper.

In front of each magnet is a plate 16, which extends from a point above the upper extension or pole-piece $14^{\times}$ to a point below the lower extension or pole-piece $14^{\times\times}$, and such plate at its upper end is provided with a screw 17, the point of which pokes loosely into a small recess in the end of the pole-piece $14^{\times}$ and forms a fulcrum for the plate.

By means of a spring 18 and an adjustable connecting-piece 19 the upper and shorter end of the plate 16 is connected to the bracket 13 or other fixed object, and by reason of the tension of the spring the lower end of the plate 16 is normally held clear of the lower pole-piece $14^{\times\times}$, as shown in Fig. 6. At its lower end the plate 16 terminates in a screw-clamp 20, which serves to attach a spring-blade 21, which at its free end carries the recording pencil or style, the plate 16, blade 21, and style collectively forming the recording-lever. The length and position of the lever are such as to cause the pencil or style to lie opposite the axis of the drum (see Figs. 2 and 3) and with the point just clear of or only lightly resting against the time-sheet. The said clamp 20 of each plate 16 passes through a slot 22 in the horizontal member of the bracket 13, and the said slot lies diagonal to the said member, as shown more clearly in Fig. 8, so that on the recording-lever being caused to move toward the magnet its lower end has a compound movement,—first, a movement toward the magnet, and, second, laterally. In such way the style or pencil is caused to mark the time-sheet, the double movement insuring the length of stroke and the requisite pressure for making such stroke, while the return movement insures the drum being relieved of the pressure of the style when not in operation. The said compound or diagonal movement, however, serves also for a further purpose, namely, the rotation of a ratchet-wheel 23 and notched disk 24, mounted upon a fixed pin or axis 25 on bracket 13, by means of a pawl 26, this latter being carried loosely by the recording-lever and held in play with the teeth of the ratchet-wheel 23 by a spring $26^{\times}$. With each inward impulse of the recording-lever the pawl advances the ratchet-wheel one tooth. In the plate 16 is a set-screw 27, projecting beyond the rear face of the plate and at a point directly opposite the periphery of the wheel 24. In the wheel 24 is the notch or recess 28.

With each impulse of the recording-lever toward the magnet the screw-point 27 strikes the periphery of the wheel 24, the plate 16 not quite touching the magnet-poles, and thereby causes the strokes or marks made by the style on the time-sheet to be of equal length. Due, however, to the notch, which comes opposite the screw-point once in every complete revolution of the whole, the movement of the lever at that point is greater, and therefore causes a correspondingly longer stroke to be impressed on the time-sheet.

By means of a small screw 29 the recording-lever is readily adjusted in relation to the poles of the magnet.

The foregoing description applies to each bracket and magnet, the several brackets lying side by side and being exactly the same for any number of machines and the drum being made long enough for the series.

To facilitate the ready introduction and removal of the drum, the floor of the casing is hinged and turns downward, (see Fig. 3), and by means of a projecting plate 30 and a recess in the inner face of the door 6 the fastening of such door serves also to fasten the floor part. To allow of the floor part turning downward, the casing will be mounted on brackets 31 or upon a stand or be suspended from an overhead support.

Referring now to Figs. 4 and 5, which show the parts associated with each machine, 32 is a small metal casing designed to be fixed by a couple of screws to the machine at a point adjacent to a moving or rotary part. Within the said casing are two terminal spring-contact blades 33, normally lying apart and one bent so as to readily approach and make contact with the other and afterward separate of its own elasticity. Connected with such blades by suitable conducting-wires is one of the magnets 15 of the recording apparatus (see Figs. 2 and 3) and an electric battery or other generator of electricity. Mounted upon a short axis 34 within the casing and extending through an opening in the top wall of the casing is a lever 35, which forms the operative part of the switch hereinbefore referred to. To the end of the lever outside the casing is imparted the motion of the rotary part of the machine, which may be effected by means of an eccentric-pin 36 in the end of a shaft 36[a], (see Fig. 1), which, projecting through a slot in the lever, wags or moves the lever to and fro as the shaft rotates. Other ways or means may be employed, the chief requirement being to move the lever to and fro.

In the examples shown in Fig. 1 the casing is secured adjacent to the shaft, and thus allows of the convenient engagement of the lever with the pin 36. Intermediate of the end of the lever within the casing and the blades 33 are means whereby at each stroke of the lever or, by preference, after a number of strokes the blades are caused to meet, and thus complete the electric circuit of the said battery and the magnet in the casing 1, whereby the recording-lever is attracted and the time-sheet marked with a stroke. The said intermediate means may take various forms; but in practice I find that the arrangement requires to be one which allows of a sufficiently long contact of the blades 33 to insure the full movement of the recording-lever no matter how rapid the machine be running, and I also find that the arrangement requires to be such as will allow the blades to separate in the event of the machine happening to stop at the moment they are moved into contact. The best arrangement known to me for fulfilling these conditions is a spring-pressed piston or plunger 37 and a cylinder 38, with one end of the cylinder near the blades 33 and fitted with an india-rubber bellows or cap 39, so that as the piston is drawn toward one end of the cylinder and suddenly returned the air within the cylinder between the piston and cap is caused to inflate the bellows or cap, and thereby press one blade against the other. The said arrangement also consists of a ratchet-wheel 40 and a cam-wheel 41, secured to each other, but loosely mounted on the axis 34 of a lever 43, loosely engaging the piston-rod 44 and formed with a shoulder or tooth which under the pull of the piston-spring 42 presses against the wheel 41 of a spring-pressed pawl 45, carried by the lever 35, and of a spring-pressed retaining-pawl 46.

In the example shown in Fig. 4, the ratchet-wheel has twenty teeth and the cam-wheel four teeth. For each forward stroke of the lever the ratchet-wheel is advanced one tooth, which in the case of a printing machine may correspond to the printing of one sheet of paper or other unit of operation to be counted, or it may correspond with a series of such units. As the ratchet-wheel is rotated one of the teeth of the cam-wheel is gradually pressing out the lever 43 and drawing the piston 37 to the opposite end of the cylinder; but as soon as the ratchet-wheel has been advanced five teeth the shoulder or tooth on the lever 43 slips off the highest or deepest part of the cam-wheel tooth and allows the piston 37 under the force of its spring 42 to suddenly move back to the opposite end of the cylinder and thereby inflate the cap 39 and make contact between the blades 33, thereafter rapidly deflating (due to the slack fit of the piston), but holding the blades together longer than an ordinary mechanical appliance would usually allow. By the time the ratchet-wheel has been advanced five more teeth the piston has been again drawn out and again released, the cap 39 again inflated, and the blades again brought into contact, and so on for each five teeth of the ratchet-wheel, and each tooth of the cam-wheel. Should the machine stop just as the piston has inflated the cap, it will be seen that the exhaustion of the cap will thereafter allow the blades to separate, and thereby prevent the batteries running down, as might be the case if the blades remained in contact until the machine was restarted.

Assuming the electric circuit of the magnet to be completed every fifth operation of the machine, it will be seen that a stroke on the time-sheet will represent five operations and in the case of a printing machine will represent five sheets. With every twentieth stroke longer than its fellow's it will also be seen that such longer stroke will represent every hundredth operation or in the case of a printing-machine every hundredth sheet.

By a variation of the wheels and movements of the lever 35 the manner of recording the operations may be varied to suit the particular requirements of each case.

Upon the time-sheet shown in Fig. 10 it will be seen how the user may determine by the strokes the amount of work done, the time taken to do the work, and by the gaps or blank spaces between each set of strokes in each column how long each machine was idle. For example, in column 1 the machine started at six o'clock, stopped at 8.30 o'clock, started again at ten o'clock, ran on until twelve o'clock, restarted at two o'clock, stopped again at four o'clock, started again at 6 and ran on until six thirty. From the second column it will be seen that the rate of production was greater, the machine being a quicker-running machine. To enable the man in charge of the machine to have a check on the work done, the switch may include a counter 48 (see Fig. 5), driven from the axis 34 by, say, a peg-wheel $48^{\times}$. To provide for the obtaining of a record when working overtime or for making the time-sheet serve for more than one day, the sheet may be printed with markings for a longer period and the drum be speeded down to suit, or instead of a drum a belt may be used; but as a daily record will be the most usual and a record of overtime will only be required occasionally I find it best to use the one-day time-sheet and to provide means whereby the drum may be moved longitudinally and bring a fresh blank space into the line of the recording-lever. To do this, the drum is mounted loosely on its axis 8, and at one end the said axis is screw-threaded and provided with a nut $8^{\times}$ (see Figs. 2 and 11), while at the other end it is provided with a bow-spring 49, the ends of which press against the end of the drum and hold the opposite end of the drum against the nut $8^{\times}$, so that after the drum has made a complete revolution and fresh spaces are required for receiving the markings of the pencils for overtime the slackening of the nut $8^{\times}$ will allow the drum to move along its axis under the force of spring 49 until the required blank spaces come opposite the pencils, when the drum can then rotate and take the record of the further work alongside the work previously recorded. (See Fig. 11.) To allow for both the axial adjustment and positive drive of the drum, the spring 49 is fast on the axis, the drum end is slotted, (see Fig. 12) and a small pin 51 on the end of the spring 49, taking into the slot, causes the spring to drive the drum positively, while allowing of the endwise movement.

In Fig. 13 I show how the motion of the drum may serve for alternately switching on and off separate batteries used in working the magnets 15, a divided ring 52 on the drum-axis and two terminals 53 being used, with one terminal pressing against one part of the ring and the other against the other part and one of said parts of the ring being in circuit with the two batteries through the drum shaft, as indicated, so that as the ring rotates the terminals make circuit first with one battery and then with the other, and thus enable the batteries to be used for a much longer period than would be possible with a battery or batteries in constant use. In practice, however, I do not find this arrangement necessary for recording the work done by a small number of machines, but for a large number it will doubtless be useful.

It will now be seen that with the recording apparatus shown in Figs. 1, 2 and 3 only connected electrically with the parts shown in Figs. 4, 5 and 6 the said apparatus and its casing may be kept or used in places removed a considerable distance from the machine or machines, and therefore in the case of works will allow of the recording mechanism being kept in, say, the office or the manager's room. Due to the character of the record it will also be seen that the apparatus will be of great use in casting piecework, making up wages, testing the economy of the machines, and, finally, will serve as a telltale against idleness, in the absence of the principal or manager. With the clock showing at one end of the casing the apparatus will also serve as a timepiece.

To allow for the holding of the styles or pencils clear of the drum while the drum is being introduced or renewed, a bar 54 (see Fig. 2) may be used, lying immediately behind the recording-levers and designed to lie, as shown, or be turned up to the horizontal and against the blades 21, and thus hold the several styles away from the drum.

To screen the magnets from view and to facilitate the reading of the time-sheet, the upper part of the glass, as shown in Fig. 1, in the casing-door may be rendered opaque and the numbers of the machines may be painted thereon.

What I claim is:

1. In work-recording apparatus, a rotary drum carrying a time-sheet, an electromagnet adjacent to said drum; a lever and pen adjacent to the drum and capable of being attracted by the magnet; means whereby the pen when the lever is attracted by the magnet is caused to mark the sheet on the drum with a short stroke longitudinally; a spring for returning the lever and pen after marking the sheet and causing the pen to lie clear of or bear lightly on the sheet; a clock for rotating the drum; a casing for inclosing the drum, magnet and lever; a switch comprising two spring-blade terminals normally lying a slight distance apart, and each terminal in circuit with the said magnet and a suitable generator of electricity; a small cylinder adjacent to the terminals; a flexible cap on the end of the cylinder nearest the terminals; a piston and spring within the cylinder; a lever engaging the piston and having a tooth on one edge; a cam-wheel and a ratchet-wheel rotatably mounted on a fixed stud and in one with each other; a retaining-pawl therefor; a further lever; and a pawl carried by said further lever by which, on the said last-named lever being moved, the ratchet-wheel and cam-wheel are rotated and the piston drawn back until the tooth on the first-named lever slips its abutment with a tooth of the cam-wheel, substantially as set forth.

2. In work-recording apparatus, a drum, a clock for rotating said drum; a magnet adjacent to the drum; a lever adjacent to the poles of the magnet and carrying at its free end a style or pen which normally lies clear of or presses lightly upon the drum; a fixed bracket with diagonal slot through which the lever loosely projects; a ratchet-wheel adjacent to the said lever; a pawl on the lever engaging the said wheel and serving to rotate it when the lever moves toward the magnet; a notched disk secured to and rotated by the ratchet-wheel; and a projection on the lever adapted to strike the periphery of the disk or take into the notch in the disk, substantially as set forth.

3. In work-recording apparatus, a switch comprising two spring-blade terminals normally lying a slight distance apart and each terminal in circuit with a magnet and a suitable generator of electricity; a small cylinder adjacent to the terminals; a flexible cap on the end of the cylinder nearest the terminals; a piston and spring within the cylinder; a lever engaging the piston and having a tooth on one edge; a cam-wheel and a ratchet-wheel rotatably mounted on a fixed stud and in one with each other; a retaining-pawl therefor; a further lever; and a pawl carried by said further lever, by which, on the said further lever being moved, the ratchet-wheel and cam-wheel are rotated and the piston drawn back until the tooth on the first-named lever slips its abutment with a tooth of the camwheel, substantially as set forth.

4. In work-recording apparatus, a casing; a motor or clock at one end of said casing; a spring-pressed bearing at the other end of the casing and in line with one of the axes of the motor; a drum and axis therefor within the casing, said axis detachably mounted between said bearing and motor-axis, and the drum slidably mounted thereon; a bow-spring; and a nut screwing onto the axis for the purpose of moving the drum endwise, substantially as herein set forth.

5. In a work-recording apparatus, the combination of a normally open electric circuit; a member actuated by a moving portion of the machine or mechanism whose work is to be recorded, said member serving to close the circuit at each complete operation or movement of the machine; a marking member having a motion substantially parallel to the recording surface; and means included in the circuit and actuated by the current passing therethrough for causing the marking member to function and at certain intervals to produce a distinctive mark or notation.

6. In a work-recording apparatus, the combination of a normally open circuit; means to periodically close the same; a marking member having a motion parallel to the recording surface; means included in the circuit for actuating the marking member; and means for causing said marking member to produce a distinctive mark at fixed intervals.

7. In a work-recording apparatus, the combination of a normally open circuit; means to periodically close the same; a marking member having a motion parallel to the recording surface; means included in the circuit for actuating the marking member; and means actuated by the marking member for allowing said marking member to produce at stated intervals marks distinctive from those formed at other times.

8. In a work-recording apparatus, the combination of a normally open circuit; means actuated by the work or machine to periodically close the same; a marking member; means included in the circuit for actuating the marking member; and means positioned by the marking member to permit the latter to move a greater distance at fixed intervals than at other times, whereby the marking device will produce a series of short lines interspersed at regular intervals with relatively longer lines.

9. In a work-recording apparatus, the combination of means for advancing a record sheet; a marking member adapted to work against said sheet; means for moving said member in accordance with the movements of the machine of which a record is to be kept; and means for periodically allowing the marking member to have a greater range of movement than usual, whereby distinctive lines will be produced at stated intervals.

10. In a work-recording apparatus, the combination of means for advancing a record sheet; a marking device standing adjacent thereto and normally out of contact therewith; and means for causing the marking device to move across the face of the record sheet, in contact therewith, and to make a series of similar marks on the sheet for a given number of operations and to then produce a different or distinctive mark at the next operation.

11. In a work-recording apparatus, the combination of means for advancing a record sheet; a marking device standing adjacent thereto; means controlled by the movement of the machine or work to move said marking device along and in contact with the face of the sheet; and a rotatable member located adjacent to the marking device and actuated thereby, said member serving to control the extent of movement of the marking device along the record sheet.

12. In a work-recording apparatus, the combination of means for advancing a record sheet; a marking device standing adjacent thereto; means controlled by the movement of the machine or work to move said marking device; a rotatable notched member located adjacent to the marking member and actuated thereby; and a projection carried by the marking device in line with the rotatable notched member.

13. In a work-recording apparatus, the combination of means for advancing a record sheet; an electromagnet; means actuated by the machine or work for controlling the current passing through the magnet; a marking lever pivoted at one side of the magnet adjacent to the poles thereof; means acting in opposition to the magnet to withdraw the marking device from the record sheet; and means for permitting the marking device to move at fixed intervals a greater distance along the record sheet than at other times.

14. In a work-recording apparatus, the combination of a normally open circuit; a recording device actuated by the current passing through the circuit when the same is closed; and a circuit-closer actuated by a moving part of the machine to close the circuit, said closer normally opening the circuit independently of the movement of the machine, whereby the circuit will be automatically opened notwithstanding stoppage of the moving part of the machine.

15. A recorder, including a periodically-operated marker having a motion parallel to the recording surface for marking thereon, said marker being operated at regular intervals farther than the normal distance to produce longer marks.

16. In a work-recording apparatus, the combination of means for moving a record sheet; and a marker having a motion first toward and then parallel to the recording surface for marking thereon, said marker being operated at regular intervals farther than the normal distance to produce longer marks.

17. In a work-recording apparatus, the combination of means for moving a record sheet; a marker having motion toward and then parallel to the recording surface for marking thereon; a notched disk, said disk coöperating with the marker and permitting the same to be moved at given intervals into the notch in said disk, whereby a longer mark may be made; and means actuated by the movement of the marker for positioning the disk.

In testimony whereof, I have signed my name to this specification in the presence of two witnesses.

SAMUEL SIMPSON BERRY.

Witnesses:

M. SHARPLES,

JAMES HILL.